(12) United States Patent
Berberat

(10) Patent No.: US 9,319,470 B2
(45) Date of Patent: Apr. 19, 2016

(54) LOCATION-BASED SOCIAL NETWORKING SYSTEM

(71) Applicant: Henry Berberat, Watertown, CT (US)

(72) Inventor: Henry Berberat, Watertown, CT (US)

( * ) Notice: Subject to any disclaimer, the term of this patent is extended or adjusted under 35 U.S.C. 154(b) by 240 days.

(21) Appl. No.: 13/903,526

(22) Filed: May 28, 2013

(65) Prior Publication Data

US 2013/0325964 A1    Dec. 5, 2013

Related U.S. Application Data

(60) Provisional application No. 61/793,639, filed on Mar. 15, 2013, provisional application No. 61/653,188, filed on May 30, 2012.

(51) Int. Cl.
| | |
|---|---|
| G06F 15/16 | (2006.01) |
| H04L 29/08 | (2006.01) |
| H04L 12/58 | (2006.01) |
| H04W 4/02 | (2009.01) |
| H04W 4/18 | (2009.01) |

(52) U.S. Cl.
CPC ............... *H04L 67/18* (2013.01); *H04L 51/20* (2013.01); *H04L 51/32* (2013.01); *H04W 4/023* (2013.01); *H04W 4/185* (2013.01)

(58) Field of Classification Search
CPC .............................. H04L 12/588; H04L 51/32
See application file for complete search history.

(56) References Cited

U.S. PATENT DOCUMENTS

| | | | |
|---|---|---|---|
| 6,810,343 B2 | 10/2004 | McKee | |
| 8,930,452 B2 * | 1/2015 | Baalu | G06Q 30/02 709/204 |
| 2003/0009381 A1 | 1/2003 | Mattson | |
| 2007/0226044 A1 | 9/2007 | Hanson | |
| 2008/0248815 A1 * | 10/2008 | Busch | 455/456.5 |
| 2009/0287544 A1 | 11/2009 | Neubardt | |
| 2010/0318571 A1 | 12/2010 | Pearlman et al. | |
| 2011/0238762 A1 * | 9/2011 | Soni et al. | 709/206 |
| 2012/0089689 A1 * | 4/2012 | Tan | H04L 51/20 709/206 |
| 2012/0246004 A1 | 9/2012 | Book et al. | |
| 2012/0258735 A1 | 10/2012 | Monteverde | |
| 2012/0324018 A1 | 12/2012 | Metcalf et al. | |
| 2013/0006749 A1 | 1/2013 | Fink et al. | |
| 2013/0035983 A1 | 2/2013 | Kursar et al. | |
| 2013/0036112 A1 | 2/2013 | Poon | |
| 2013/0103946 A1 * | 4/2013 | Binenstock | H04L 63/0492 713/168 |

* cited by examiner

*Primary Examiner* — Esther B Henderson
(74) *Attorney, Agent, or Firm* — St. Onge Steward Johnston & Reens LLC

(57) ABSTRACT

A system for receiving and distributing social media content associates content with a particular geographic location. Users who view the social media content can have more confidence in its authenticity because the system only allows content to be uploaded when in proximity to the associated geographic location. Channels categorize the content into different subject-matter. A user can watch a channel and the geo-specific content updates as a user changes location.

18 Claims, 16 Drawing Sheets

LOCATION-BASED SOCIAL NETWORKING SYSTEM

FIELD OF THE INVENTION

The present teachings relate generally to social networking and, more particularly, to methods and systems for managing the receipt and distribution of location-based social media content.

BACKGROUND OF THE INVENTION

Social networking applications (e.g., Facebook, Twitter, etc.) provide the ability for users to create and share social media content. This content includes text comments, photos, videos, status updates, "likes," etc. This content is typically stored on a provider server and can be accessed by users on client devices such as smart phones through each provider's interface.

Users of social networking applications often create social media content that relates to a geographic location (or an event at a geographic location). For example, a user may provide real-time status updates of a parade. However, there is no way to assure that the user who creates the social media content is actually at the parade. This may have negative effects such as, for example, when a user provides a negative review of a restaurant when the user was never actually at the restaurant.

U.S. Pat. Pub. No. 2012/0324018 to Metcalf et al., the content of which is incorporated by reference in its entirety, discloses the creation of social networking spaces referred to as "bubbles," whereby users in the same bubble can interact with each other. Metcalf's bubbles are event-focused and users create (or join) a bubble in order to interact with each other using the system. U.S. Pat. Pub. No. 2012/0246004 to Book et al., the content of which is incorporated by reference in its entirety, discloses a system for providing feedback associated with an experience at a merchant. U.S. Pat. Pub. No. 2010/0318571 to Pearlman et al., the content of which is incorporated by reference in its entirety, discloses social networking "channels."

The prior art fails to disclose the present system for collecting and sharing geo-specific content. What is desired is a system for receiving and sharing content based on geographic location, that updates geo-specific content as a user changes location, and that utilizes subject-matter channels. This way, a user can "watch" geographic- and subject-relevant content, which updates as the user changes location. Therefore, it would be beneficial to have a superior location-based social networking system.

SUMMARY OF THE INVENTION

The needs set forth herein as well as further and other needs and advantages are addressed by the present embodiments, which illustrate solutions and advantages described below.

The system of the present embodiment includes, but is not limited to, a server and a database in electronic communication with the server, the database having a plurality of content, each of the plurality of content associated with a content location and one of a plurality of content channels. The system also includes a content viewer on a mobile device in electronic communication with the server over the Internet, the content viewer showing a subset of the plurality of content to a user, the content location associated with each of the subset of the plurality of content within a predetermined distance of a current location of the mobile device, the subset of the plurality of content changing as the current location of the mobile device changes. The system also includes a channel selector on the mobile device for the user to select one of the plurality of content channels, upon selection the subset of the plurality of content changing to include only content associated with the selected content channel. The system also includes a content creator on the mobile device accepting new content from the user, the new content associated with a new content location, the creation of the new content only allowed if the new content location is in proximity to the current location of the mobile device, upon creation the new content stored in the database as one of the plurality of content. The system also includes an interface on the server and in electronic communication with one or more providers over the Internet, the interface receiving some of the plurality of content from one of the one or more providers.

The method of the present embodiments includes the steps, but is not limited to, providing a server and storing in a database a plurality of content, each of the plurality of content associated with a content location and one of a plurality of content channels, the database in electronic communication with the server. The method also includes providing on a mobile device a subset of the plurality of content, the content location associated with each of the subset of the plurality of content within a predetermined distance of a current location of the mobile device, the subset of the plurality of content changing as the current location of the mobile device changes. The method also includes providing a channel selector on the mobile device for a user to select one of the plurality of content channels, upon selection the subset of the plurality of content changing to include only content associated with the selected content channel. The method also includes receiving new content from the user with the mobile device, the new content associated with a new content location, the creation of the new content only allowed if the new content location is in proximity to the current location of the mobile device, upon creation the new content stored in the database as one of the plurality of content. The method also includes receiving on the server some of the plurality of content from one of one or more providers, the server in electronic communication with the one of the one or more providers over the Internet.

Other embodiments of the system and method are described in detail below and are also part of the present teachings.

For a better understanding of the present embodiments, together with other and further aspects thereof, reference is made to the accompanying drawings and detailed description.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

The system according to the present teachings allows content creators to post and retrieve content such as comments/pictures/videos/etc. (e.g., social media content, generically referred to as "content") that is associated with a geographic location. The system may restrict a user from uploading (e.g., posting, sharing, etc.) social media content associated with a particular geographic location unless the user is at that location. For example, a user may provide a review of a local restaurant by uploading an image and commenting on a meal. However, it would be helpful to other users if they had some confidence that the review was created by someone who was actually at the restaurant and not simply an artificial review. The system according to the present teachings can help accomplish this and other objectives.

In order to accomplish one or more of the objectives of the present teachings, social media content may be associated with a geographic location. This may be performed automatically based on the geographic location of where the content is created and/or uploaded, although not limited thereto. In another embodiment, a user may select the location with certain parameters, such as zip code, place name, etc. and manually assign a geographic location to social media content. The system may provide an indicator (e.g., location information, a confirmation flag, or some other indicator) that the content is relevant to a particular location. A "location" can be an event (e.g., a parade), an establishment (e.g., a restaurant), or some other identifier of a geographic location, although not limited thereto.

In one embodiment, a user has to be within a predetermined range of the geographic location (e.g., 500 ft, 1 mile, 5 miles) to view and/or create associated social media content. In an alternative embodiment, a user may select the location with certain parameters, such as zip code, place name, etc. in order to view social media content associated with a particular geographic location. In addition, even though a user may be able to view content from anywhere, users may only create content if they are actually at or within a certain radius of the location, although not limited thereto.

Figure 1:
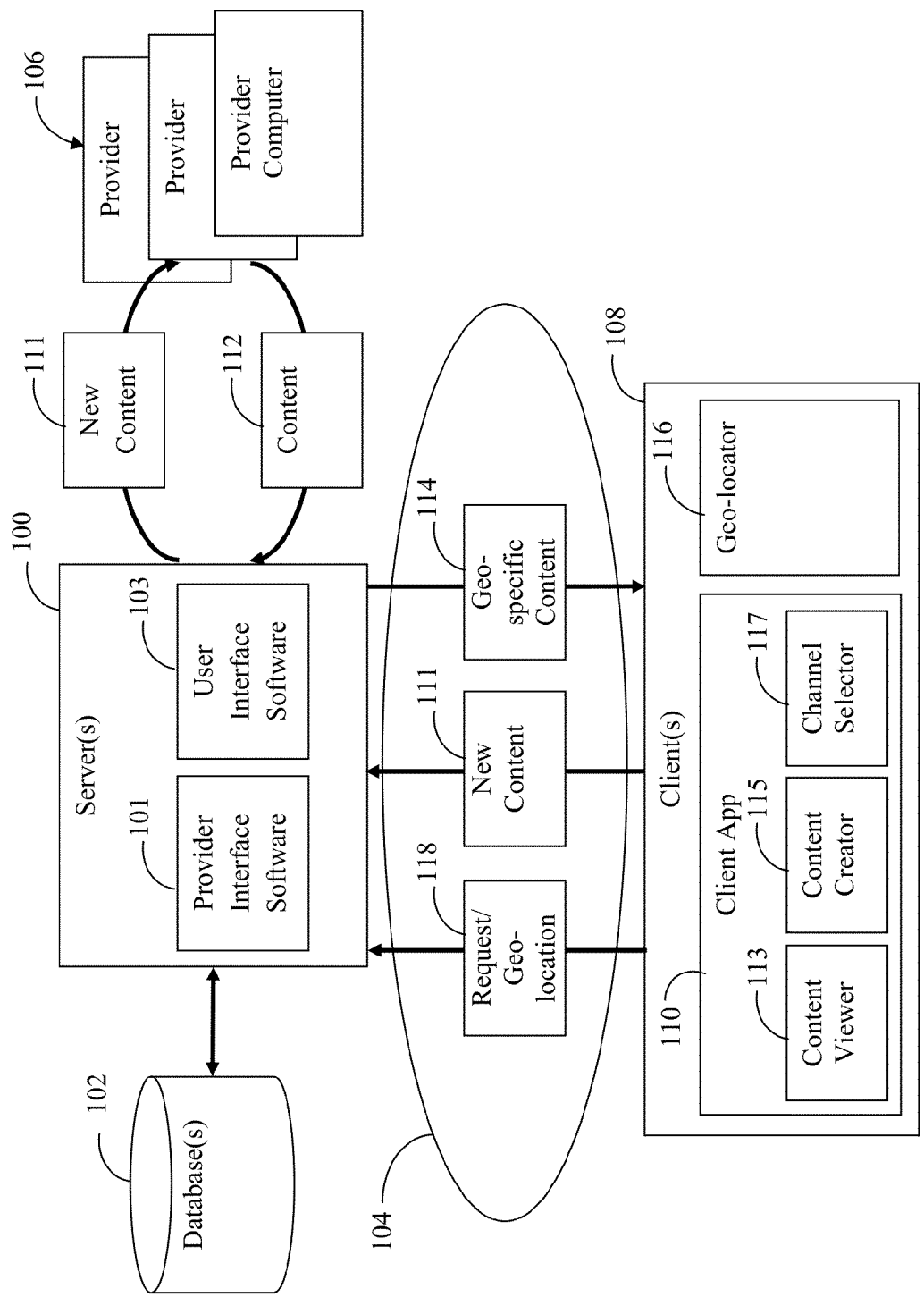
FIG. 1 is a schematic diagram of one embodiment of the system according to the present teachings.

Referring now to FIG. 1, shown is one embodiment of the system according to the present teachings. The system may comprise a server or servers 100 having software that manages the receipt and distribution of content. It is to be appreciated that the functionality described herein may be provided in hardware, software, or any combination thereof. However, software executing on computer readable media may be preferred.

The server 100 may interact with one or more providers 106 (e.g., social networking systems like Facebook, Twitter, etc.) in order to exchange social content. For example, the social content may be stored in a provider's database(s) and/or the system's database(s) 102, although not limited thereto. This may be performed by provider interface 101 software.

In one embodiment, the provider interface 101 software may request content 112 from providers 106, which it can store in its database 102 and distribute to users of the system as geo-specific content 114. It is to be appreciated that content received from providers 106 may have location information (e.g., be geo-tagged) in order to associate it with a geographic location, or subject-matter information (e.g., comments, picture title, etc.) to associate it with a channel, although not limited thereto. Provider interface 101 software may also send new content 111 (e.g., created by users of the system) to the provider 106. This way, the new content 111 can be shared on other social networking systems, although not limited thereto.

Using a client device 108, users may access the system in order to upload and view content. Access may be over a network 104 such as the Internet. A client device may be any configured computer, including a desktop PC, laptop, tablet, smart phone, iPhone, iPad, Blackberry, Android phone, etc. Content may be created by accessing user interface 103 software provided by the server 100, such as a website, API or some other interface. In another embodiment, a user may utilize a mobile device such as a smart phone (or tablet, laptop, etc.) and download a client app 110. The client app 110 may provide functionality for the user to upload social media content to the system and retrieve content from the system, discussed further below.

The client device 108 may have a geolocator 116 that may tag new content with a geographic location. A geolocator 116 may be a GPS, or some other technology for determining the location of the client device 108.

The client device 108 may have software running on it to perform various functions, discussed further below in reference to various exemplary user interfaces. For example, a content viewer 113 may provide a user interface for showing geo-specific content 114 to a user. A content creator 115 may provide a user interface for creating new content 111. A channel selector 117 may provide a user interface for selecting subject-matter channels of content. In operation, a user of the client device 108 may send a request 118 (e.g., select a channel, provide filter criteria, identify geographic boundaries, etc.) for content and the server 100 will return relevant geo-specific content 114 to the user. In one embodiment, the request 118 may only include the location of the client device 108 as provided by the geolocator 166, although not limited thereto.

In one embodiment, users of the system may register with the system. In this way, they may create a profile and social networks of linked "friends," although not limited thereto. Users may also be pre-approved in order to provide social media content. For example, a user may be granted permission to upload content relating to a particular geographic location by the location's owner. In this way, the system may be a private social network and the system may provide groups of users associated with geographic locations, although not limited thereto. In some embodiments, the user may post to or share the content with a particular social networking application or predetermined recipients. Permissions may also be granted for users to comment or supplement social media content uploaded by others. For example, a user may only be able to comment on social media content uploaded by a "friend." In another embodiment, the user may only comment on social media content if that user is also at the associated geographic location. It is to be appreciated that there are a variety of ways of controlling access to edit and view social media content according to the present teachings, as would be appreciated by one skilled in the art, and the present teachings are not limited to any particular embodiment disclosed herein.

In another embodiment, the system may categorize the social media content, which may be performed in any number of different ways. For example, the system may have area-specific "channels" targeting particular geographic locations or venues. These may be completely open, have posts monitored and approved before being posted, and/or allow only approved users to submit posts, although not limited thereto. Such a system may allow users to tune into a particular channel and view relevant social content as it is being created and uploaded. Channels may also be created for particular user characteristics (e.g., demographics, etc.), subjects, etc., although not limited thereto.

Figure 2:
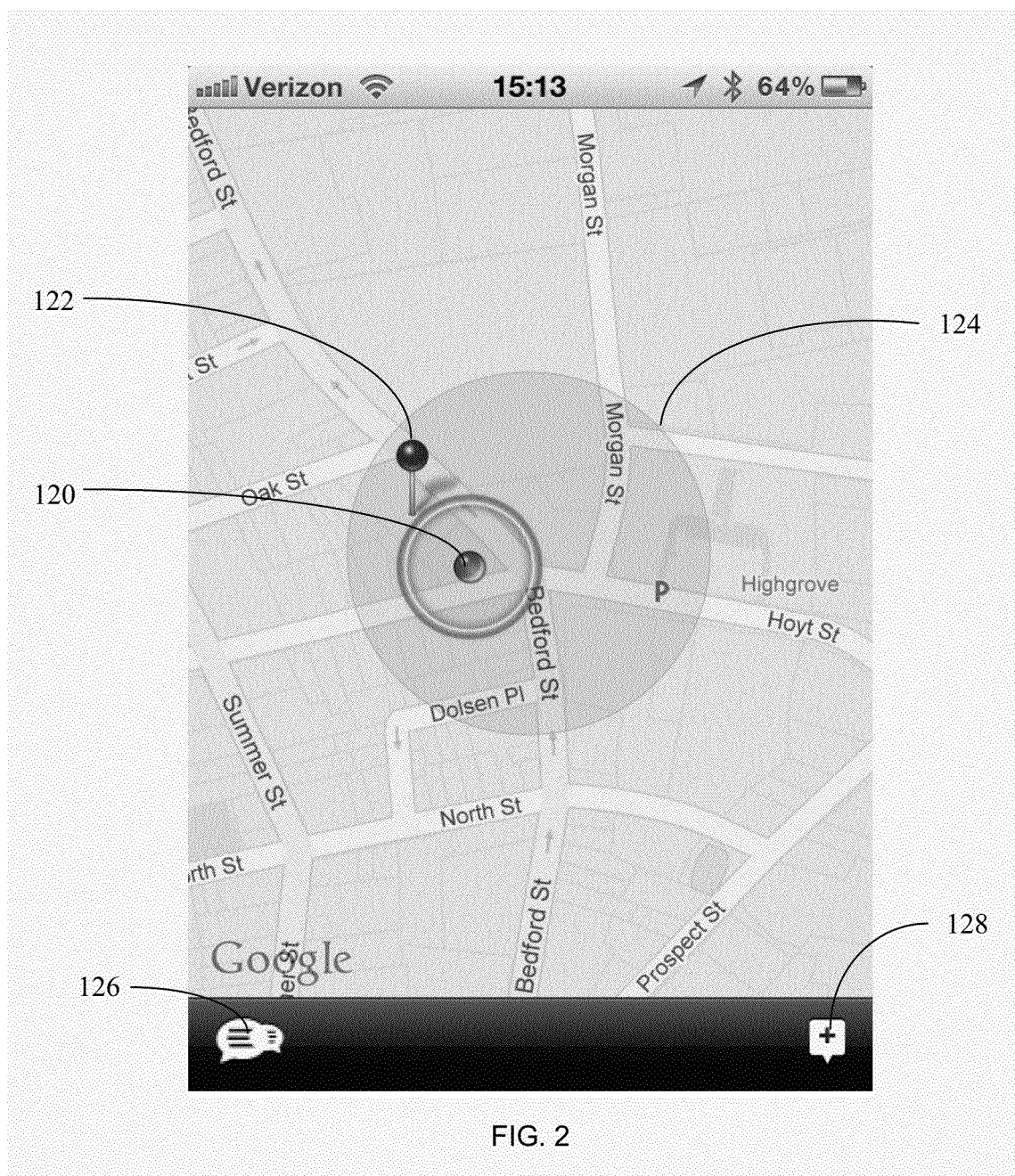
FIG. 2 is a representative screen shot of one embodiment of the user interface according to the system of FIG. 1, depicting the location of a user and a nearby geographic location.

Referring now to FIGS. 2-16, shown are representative screen shots of embodiments of the user interface 103/110 for the system of FIG. 1. As shown in FIG. 2, the user interface may depict the location of a user 120 and a nearby geographic location 122. The user interface may also depict a radius 124 or some other designation of area for which a user can view content posted by others, or create content. In this way, users of the system may only be able to view and/or upload content associated with a geographical location in proximity to them (e.g., within the "radius," etc.), thus helping to insure that content is more relevant.

Figure 7:
FIG. 7 is a representative screen shot of the user interface depicting a list of content associated with a geographic location in proximity to the user.

The user interface may provide various buttons to access functionality. For example, a content button 126 may bring the user from the map (as shown in FIG. 2) to a list of available content (as shown in FIG. 7). An add content button 128 may allow a user to add content (e.g., as shown in FIG. 3.).

Figure 3:
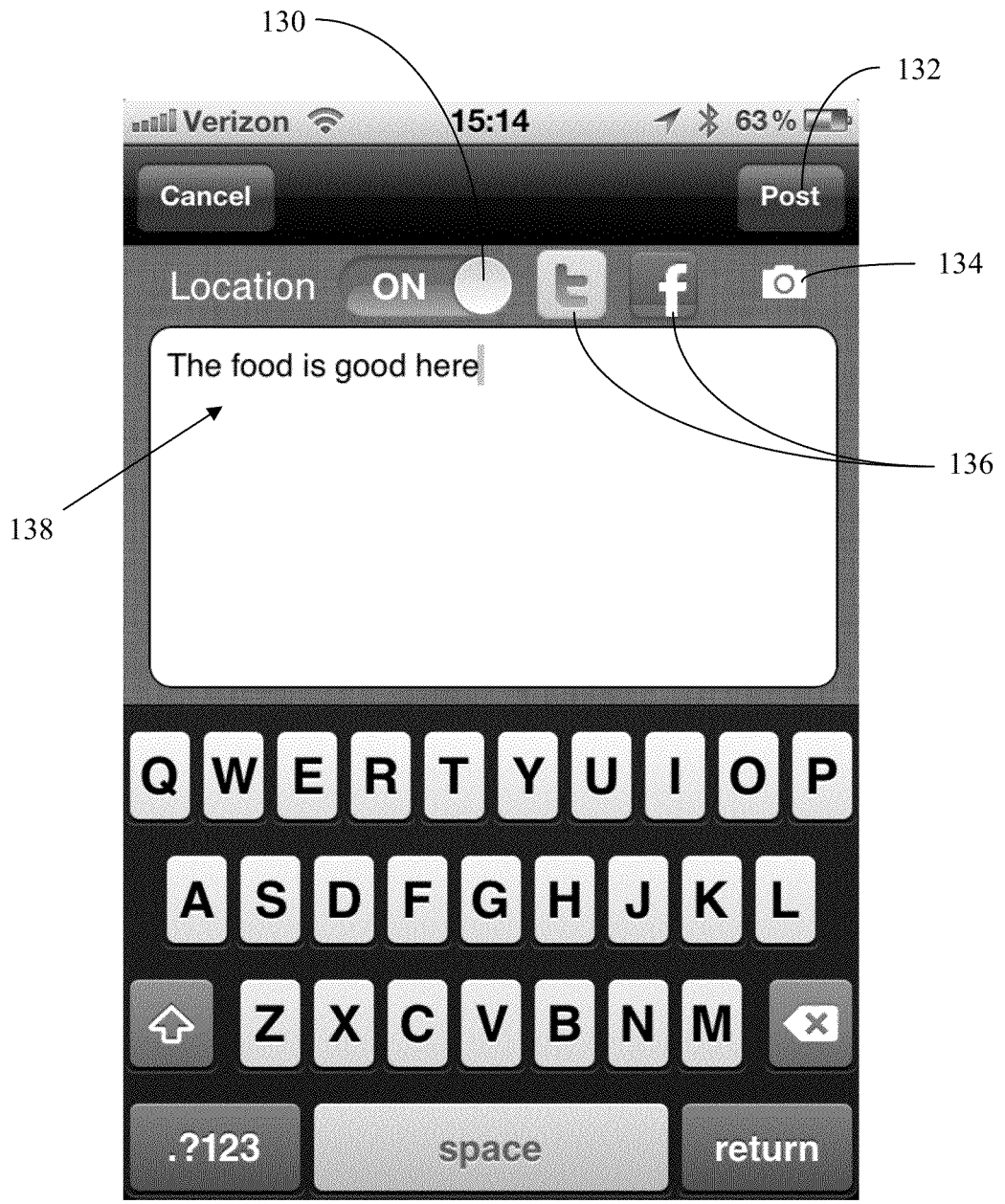
FIGS. 3-4 are representative screen shots of the user interface depicting the creation of content.
Figure 4:

As shown in FIGS. 3-4, the user interface may provide for the creation of content. For example, the user may create text content (shown in FIG. 3) or image content (shown in FIG. 4), although not limited thereto. A user may associate the content with a particular geographic location by searching for it or selecting it on a map, although not limited thereto. In another embodiment, the social media content may automatically be associated with a particular geographic location based on where the content was created and/or uploaded to the system, and/or based on predetermined permissions of the user (e.g., associated channels, geographic locations, groups, etc.), although not limited thereto.

As shown in FIG. 3, a user can turn on or off 130 the geo-locator of the mobile device. When the geo-locator is on, however, content 138 may be geo-coded with the current location of the mobile device. When ready, the user may post 132 the content 138 to the system in order to share it with others, although not limited thereto. A camera button 134 may allow for the association of image content (shown in FIG. 4), although not limited thereto. Buttons for various providers such as social networking providers 136 may allow a user to view specific content provided by those providers, although not limited thereto.

Figure 5:
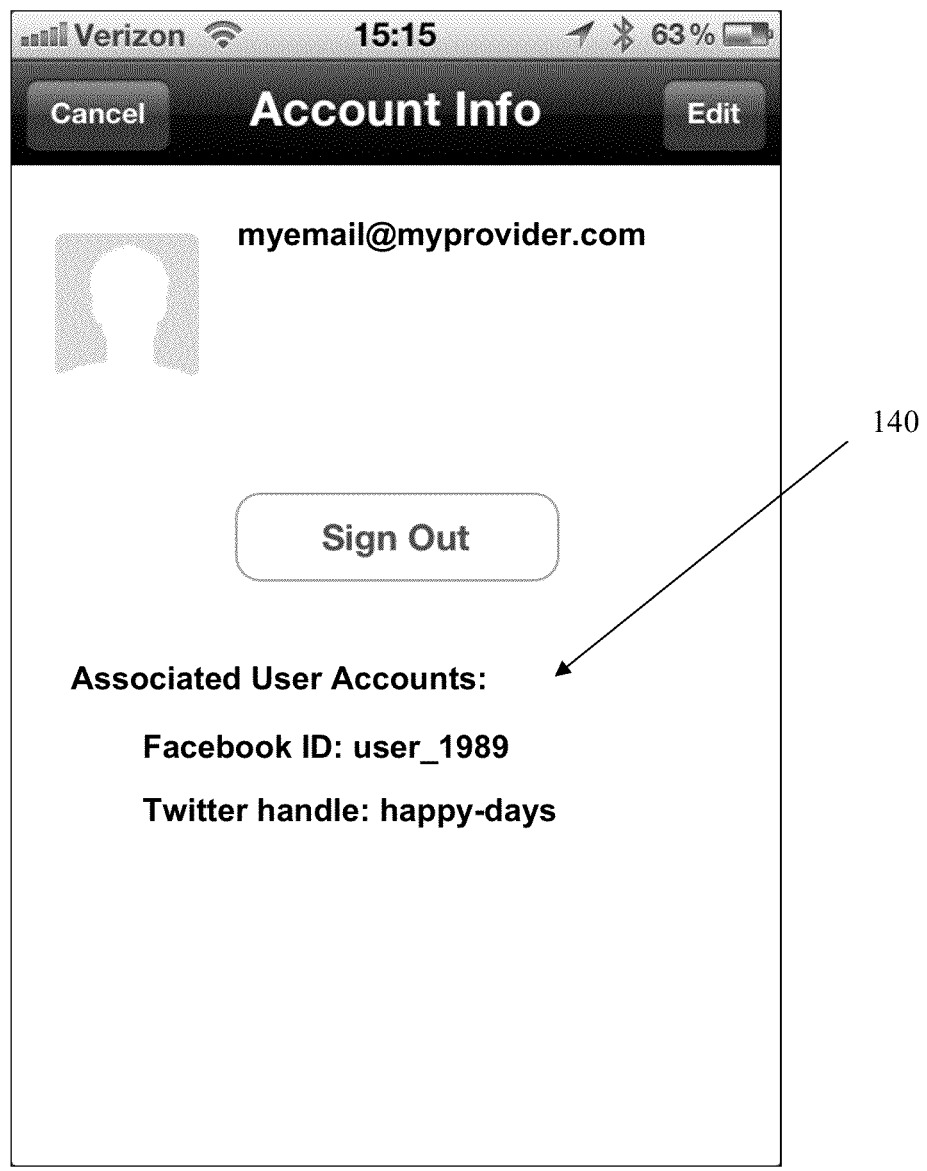
FIG. 5 is a representative screen shot of the user interface depicting a user profile.

The system may allow a user to create a user profile, which may be stored in database 102 (shown in FIG. 1). A user profile may include contact information, permissions, preferences (e.g., geographic location of home, work, etc.), lists of social networks (e.g., "friends", etc.), and sign-in information as shown in FIG. 5, although not limited thereto. In this way, a user may log into the system in order to create (e.g., upload, etc.) as well as view social media content, although not limited thereto. The user profile may store associated accounts 140 from content providers. This may allow the system to exchange data with those providers using the user's account on the provider systems.

Figure 6:
FIG. 6 is a representative screen shot of the user interface depicting associating a provider account with a user profile.

A user's account may be associated with accounts on various social networking sites (e.g., providers, etc.). As shown in FIG. 6, a user may log into Facebook and associate their Facebook account with their user profile on the system. This may allow for the exchange of social networking content. For example, if a user uploads content to the system, the system may post that content to a user's associated Facebook account, although not limited thereto. This may be based in part upon preferences stored in the user's profile, although not limited thereto. Similarly, the system may retrieve social media content from providers based on geographic location, although not limited thereto. It is to be appreciated that the present teachings may be used with any social networking site and the present teachings are not limited to any particular embodiment disclosed herein.

The system may also be used with other types of sites, such as traditional news sites, which may provide content that is associated with particular geographic locations (e.g., geotagged, etc.). In one embodiment, the system may provide relevant (e.g., by location, subject-matter, based on profile, etc.) advertisements to the user. It is to be appreciated that advertising could be sold based on any number of demographics and added to the content "feed" with other content.

In order to exchange data with providers, the system may utilize a provider's application programming interface (API), although not limited thereto. The system according to the present teachings may store the interface requirements for any number of different providers so that content can be formatted appropriately and sent to a provider. Similarly, the system may retrieve relevant content from the provider and format it to display to users of the system. One skilled in the art would appreciate that there are many ways to interface with providers in order to exchange data and the present teaching are not limited to any particular embodiment disclosed herein.

Figure 8:
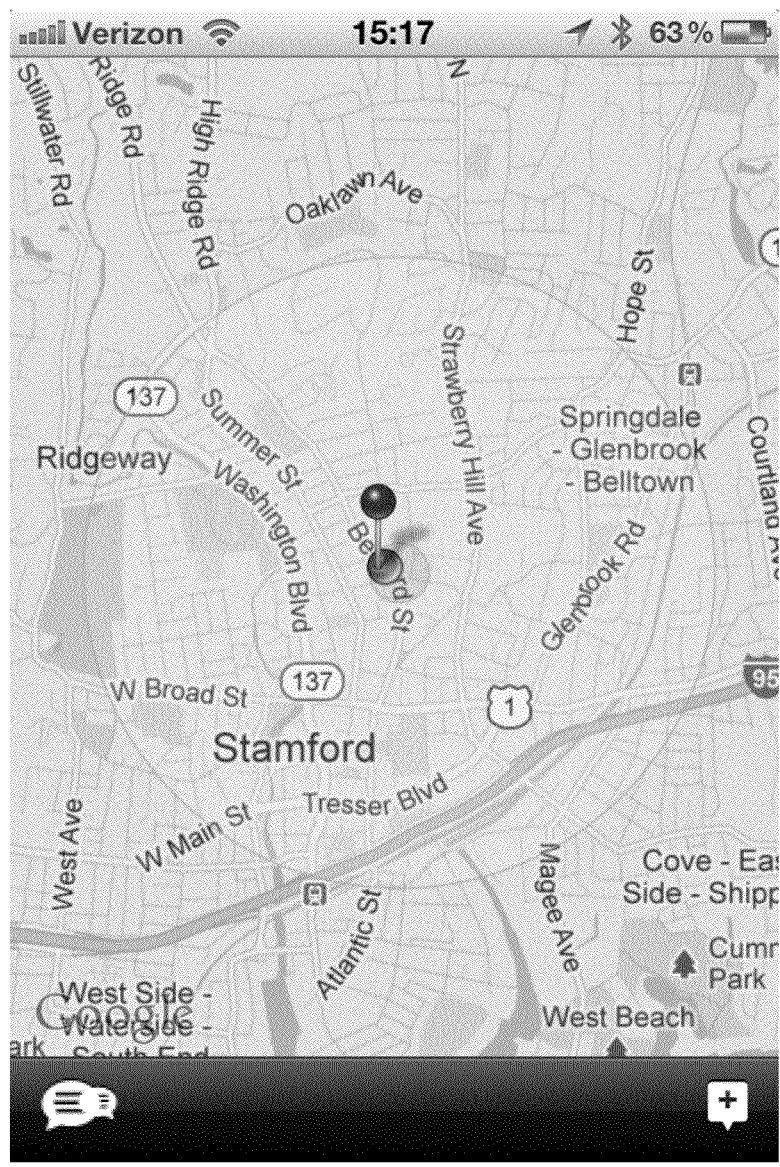
FIGS. 8-9 are representative screen shots of the user interface depicting tracking a user's location.
Figure 9:
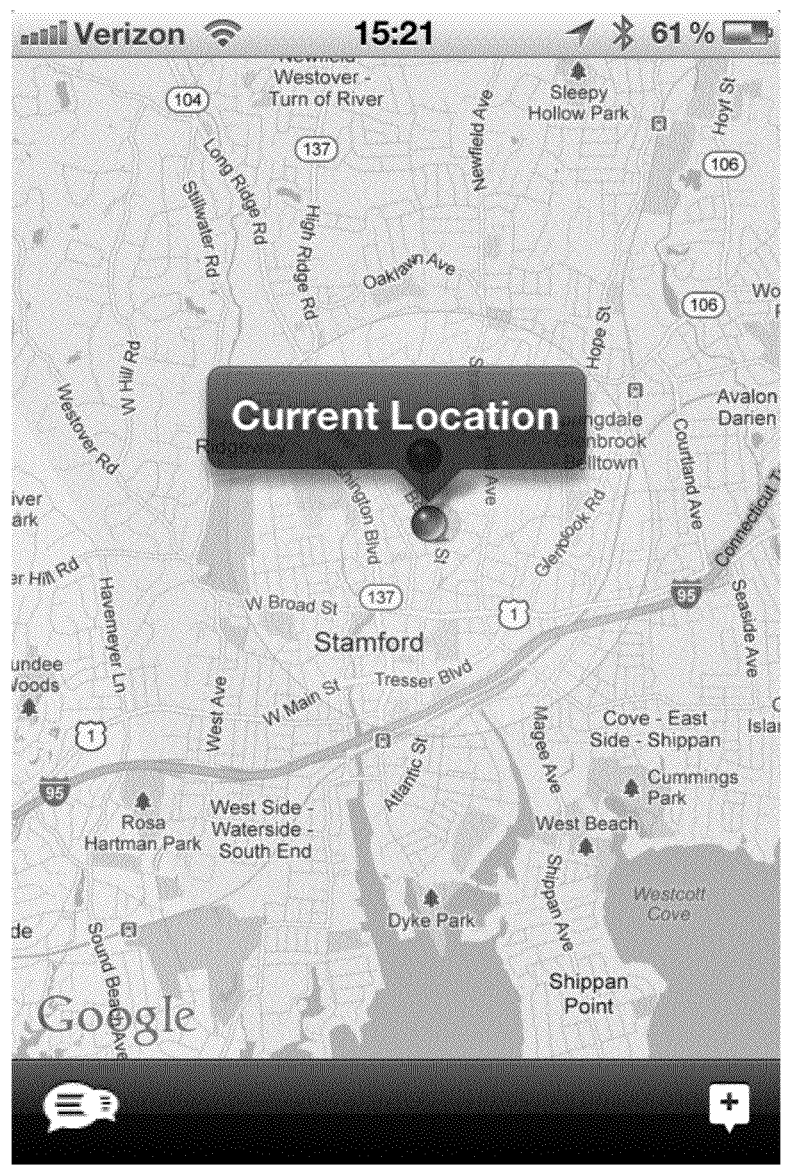

As shown in FIG. 7, the user interface may provide a list of all content that is associated with a geographic location in proximity to the user. The user may optionally select to view only content posted within a predetermined distance 152 from the user at any given time (e.g., 500 ft, 1 mile, 5 miles). This way, a user may more easily view geo-relevant content. Using "channels," a user may also search for content associated with a particular subject-matter. For example, the user may want to see all content within 1 mile relating to restaurants, music, or shopping, although not limited thereto. This may allow a user to identify positive reviews for a restaurant or be alerted to shopping sales, although not limited thereto. A user may select the content or select the associated geographic location for more detail, although not limited thereto. As a user travels the system may track the user's location, as shown in FIGS. 8 and 9. This may be performed by the user's mobile device, which may have a geolocator such as a GPS or similar technology, although not limited thereto. A profile button 150 may allow the user to change their settings (shown in FIG. 5). A map button 154 may allow the user to view the map (shown in FIG. 2).

Figure 10:
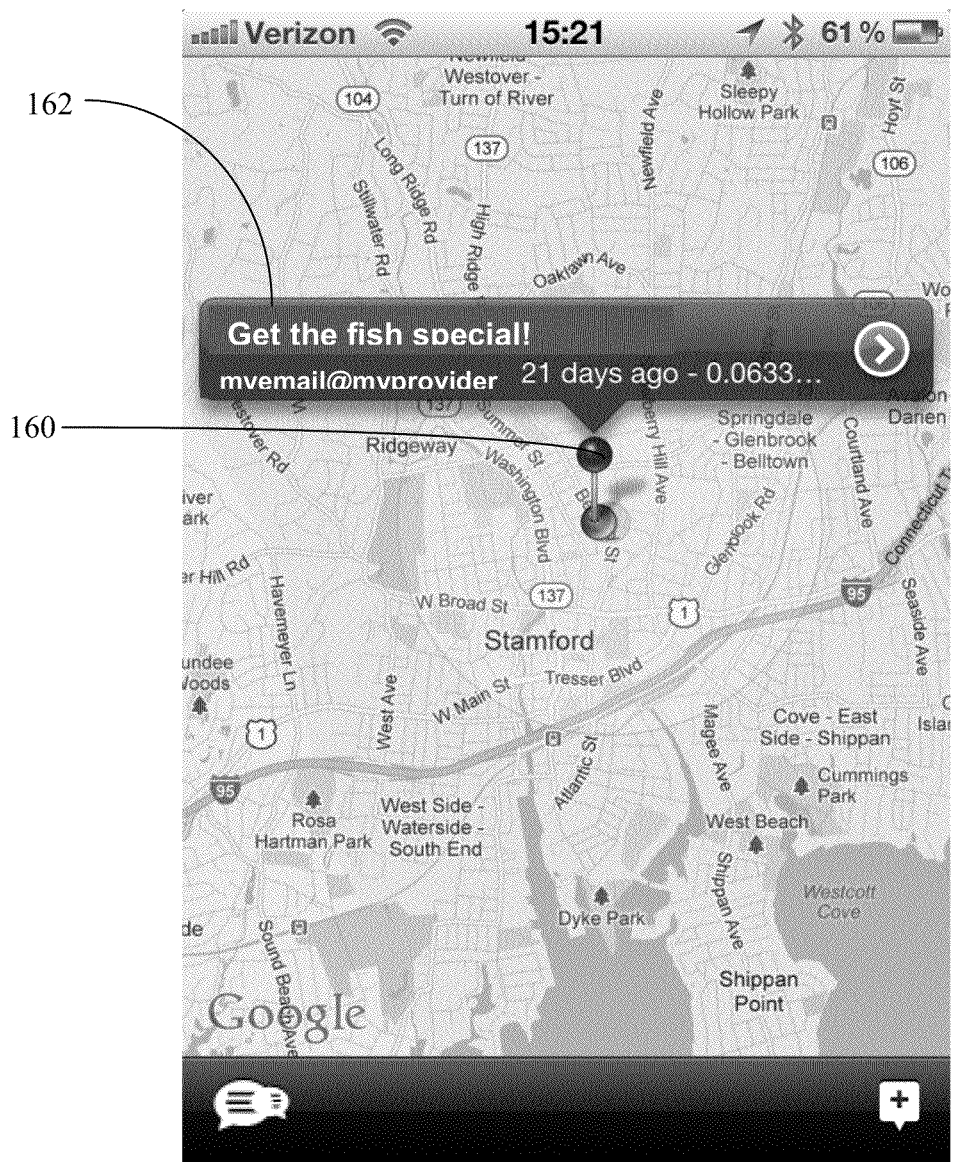
FIG. 10 is a representative screen shot of the user interface depicting an indicator of content.

When a user travels in proximity to a geographic location for which there is associated content, the system may provide an indicator 130, as shown in FIG. 10. The system may automatically show associated social media content 162 when the user gets within a predetermined proximity to the geographic location, although not limited thereto. In another embodiment, a user may select the indicator 160 (e.g., tap on screen, etc.) in order to view the associated social media content 162.

Figure 11:
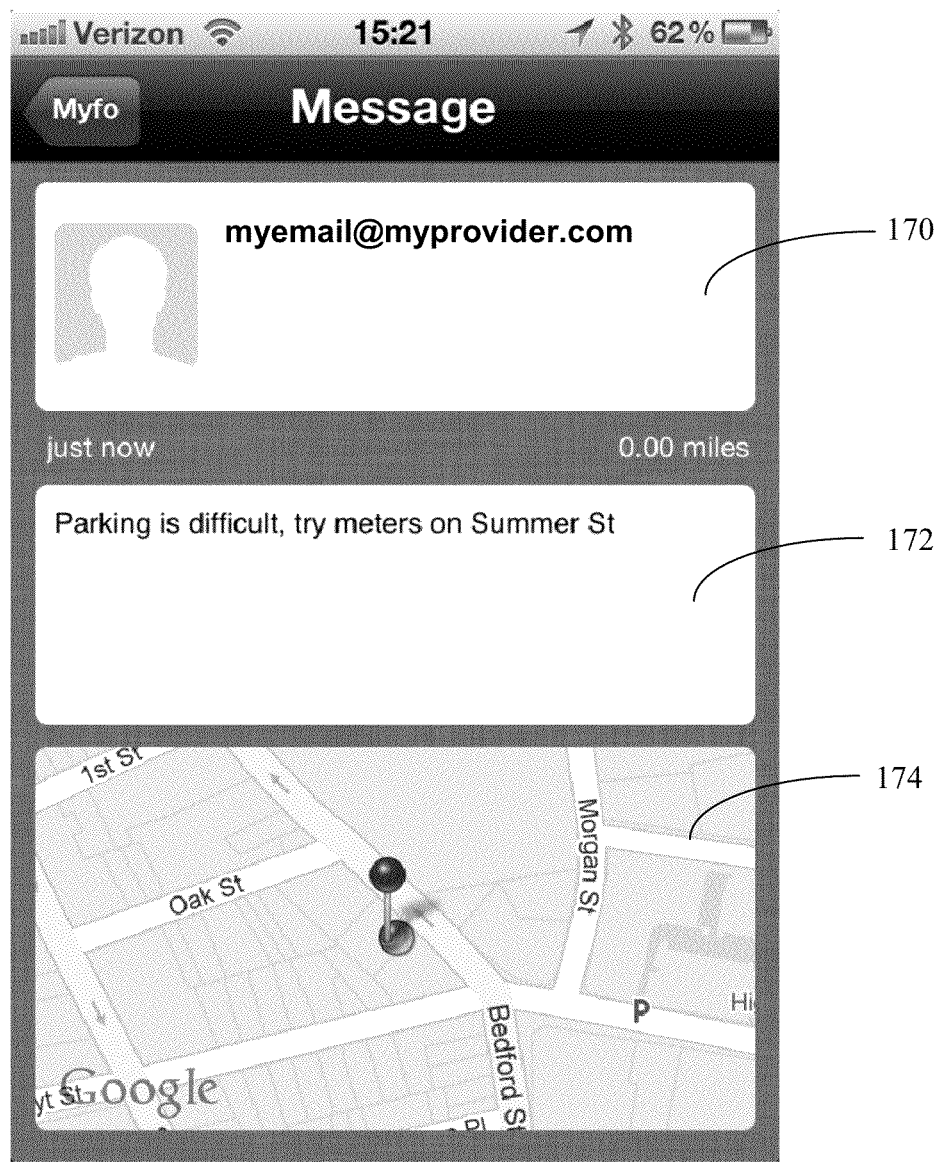
FIG. 11 is a representative screen shot of the user interface depicting a detailed view of content.

A user may select the social media content 162 in order to view more detailed information, as shown in FIG. 11. For example, a detail screen may provide information on when/where 174 the content was created, by whom 170, and any associated media content 172 (e.g., likes, comments, category, etc.), although not limited thereto.

The system may also include a "channel" feature that allows users to create channels of their own. Users may select channels created by other users or predetermined standard channels, although not limited thereto. Users and/or system administrators may also establish particular default ranges for a channel, such that only content within that range of the user will be shown. For example, there may be an Anytown, USA channel with a base point in the center of Anytown and a radius of 3.5 miles. In the alternative, a user may create a Mywork channel from the center of their office and give it a range of 0.1 miles, just enough to cover the building area.

The channel feature may include the following functionality:

1) Allow a user to 'watch' certain channels and be notified when posts are made. This is essentially letting users create a favorites list so they don't have to scroll through a lengthy channel list to find what they want. The notification (e.g., alert) may be similar to other applications, as would be appreciated by one skilled in the art. For example, it may allow a user to choose to be notified by popup icon, vibration, and/or sound, although not limited thereto; and 2) Allow a user to create a private channel where they will be the administrator and can control who can view and create posts.

Figure 12:
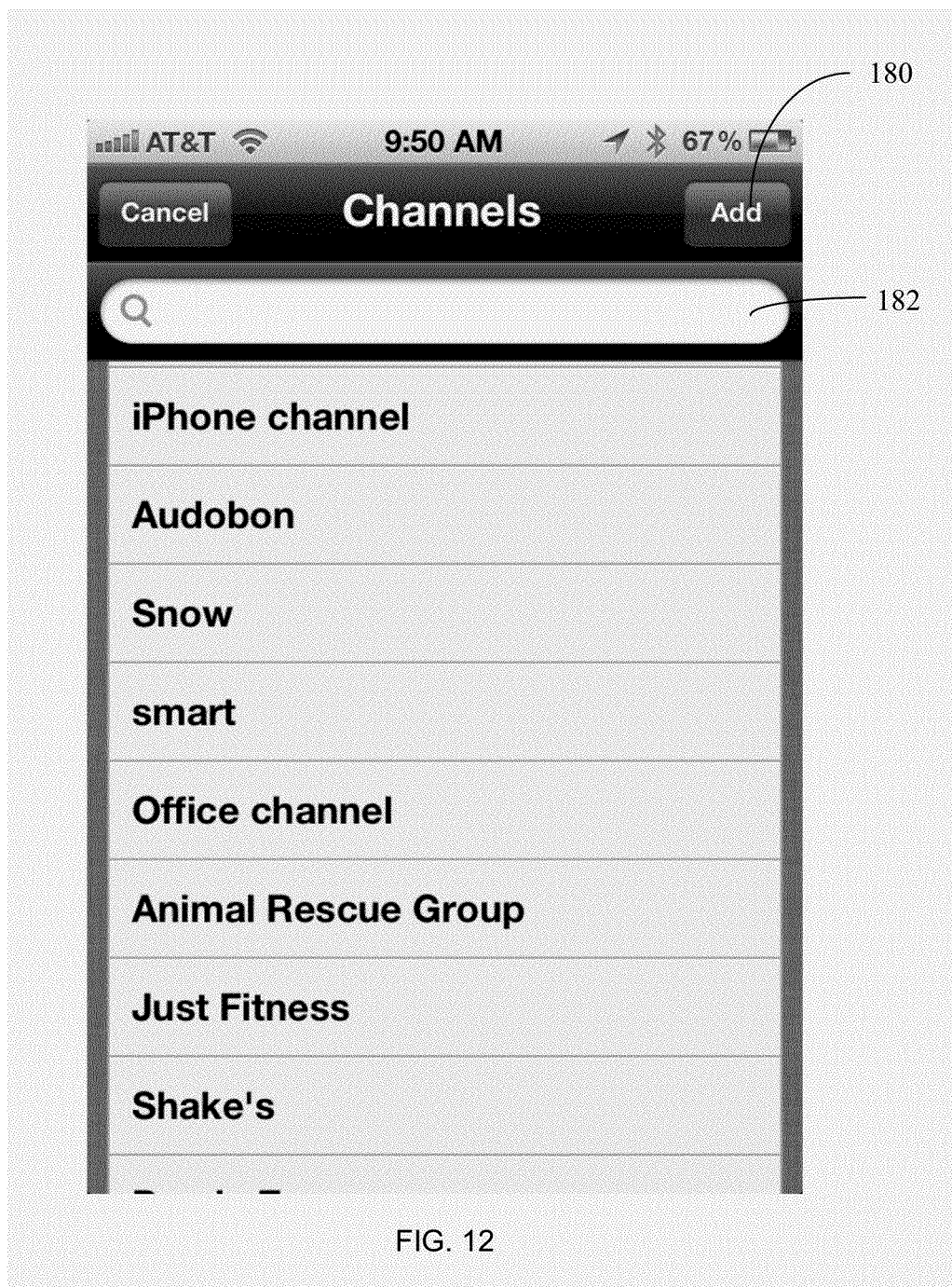
FIG. 12 is a representative screen shot of the user interface depicting subject-matter channels.

Referring now to FIG. 12, shown is one example of the user interface having numerous subject-matter channels. Content may be associated with a channel by a user (either upon creation or after, etc.) or may be automatically associated with a channel based on predetermined conditions (e.g., proximity to a particular landmark, etc.). Users may be able to search 182 for existing channels or create 180 a new channel, although not limited thereto. Users may also be able to add a channel to a favorites list.

Within a channel, a user may request permission to post, and an administrator of the channel may allow or deny permission. The channel may be viewed by authorized posters, or in some embodiments any/all users. This may also apply to the viewing through an associated website, although not limited thereto.

Figure 13:
FIGS. 13-14 are representative screen shots of the user interface depicting channel content.
Figure 14:
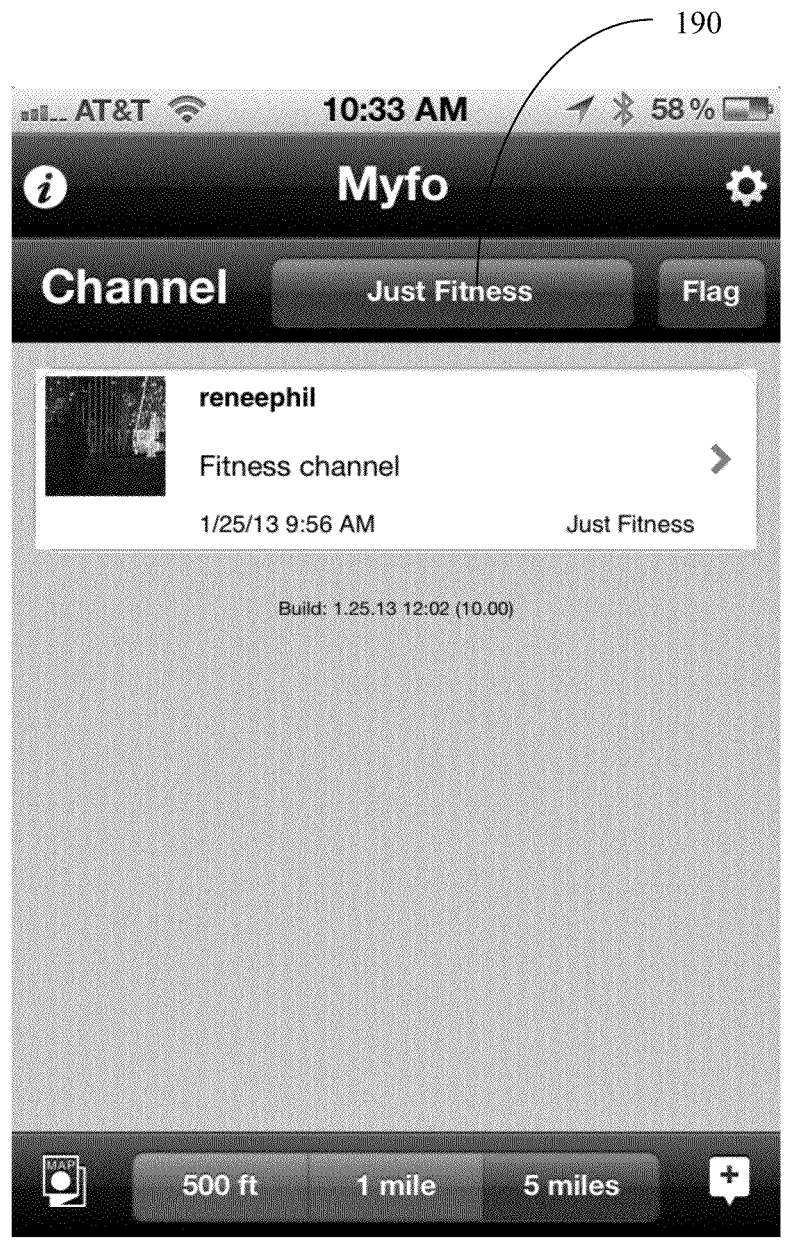

Referring now to FIGS. 13 and 14, shown are embodiments of the user interface where content from all channels or a particular channel (e.g., "Just Fitness" in FIG. 14) is displayed. Content may be limited by geographic proximity (as shown), user preferences as defined by a user (e.g., show only content from friends, etc.) or channel characteristics, although not limited thereto.

A user can choose the channel to view by selecting a channel selector button 190, although not limited thereto. A user can also flag 192 a channel, which may save it to favorites or report the channel as inappropriate, although not limited thereto. Various content 196 for the channel may be shown. Along with the content may be shown its associated channel, the content creator, the time of creation, and the current distance of the user to the location associated with the content, although not limited thereto. There may also be comments (e.g., replies 194) associated with the content.

Figure 15:
FIG. 15 is a representative screen shot of the user interface depicting the creation of content associated with a channel.

Referring now to FIG. 15, shown is one example of the user interface for creating content associated with a channel (e.g., "Soccer Moms"). Image content 200 may be associated with text content, although not limited thereto.

Figure 16:
FIG. 16 is a representative screen shot of the user interface depicting replying to content.

Referring now to FIG. 16, shown is one example of the user interface for replying to content. As shown, content 212 may be geocoded with the location (e.g., map 220 shown and distance 214 from user) where the content 212 was created as well as a particular channel 216. Users may then "reply" 210 to the content 212 and the reply 218 sent directed to the content creator or associated with the content 212 and posted to others, although not limited thereto. In one embodiment, the system may provide direct messaging functionality for users to communicate with each other, such that the messages are only shared with recipients.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A location-based social networking system, comprising:
   a server;
   a database in electronic communication with the server, the database having a plurality of content, each of the plurality of content associated with a content location and one of a plurality of content channels;
   at least one mobile device;
   a content viewer on the mobile device in electronic communication with the server over the Internet, the content viewer showing a subset of the plurality of content to a user, the content location associated with each of the subset of the plurality of content within a predetermined distance of a current location of the mobile device, the subset of the plurality of content changing as the current location of the mobile device changes;
   a channel selector on the mobile device for the user to select one of the plurality of content channels, upon selection the subset of the plurality of content changing to include only content associated with the selected content channel;
   a content creator on the mobile device accepting new content from the user, the new content associated with a new content location, the creation of the new content only allowed if the new content location at the current location of the mobile device, upon creation the new content stored in the database as one of the plurality of content; and
   an interface on the server and in electronic communication with one or more providers over the Internet, the interface receiving some of the plurality of content from one of the one or more providers.

2. The system of claim 1 wherein the server comprises more than one computer.

3. The system of claim 1 wherein the predetermined distance is provided by the user.

4. The system of claim 3 wherein the predetermined distance is selectable with one selectable value being a distance of 1 mile.

5. The system of claim 1 wherein the content creator associates the new content with one of the plurality of content channels.

6. The system of claim 1 wherein the interface sends the new content to the one of the one or more providers.

7. The system of claim 1 wherein the new content location comprises an event.

8. The system of claim 1 further comprising a website interface on the server, the website interface allowing the user to view the plurality of content.

9. The system of claim 1 wherein one of the plurality of content channels comprises a private channel, with only predetermined users having access to content associated with the private channel.

10. The system of claim 1 wherein the user comments on one of the subset of the plurality of content.

11. The system of claim 10 wherein comments are not allowed if the current location of the mobile device is not at the content location associated with the one of the subset of the plurality of content.

12. The system of claim 1 wherein the one of the one or more providers is a social networking provider.

13. The system of claim 1 wherein the mobile device provides a notification of a change in the subset of the plurality of content.

14. A method for location-based social networking, comprising the steps of:
   providing a server;
   storing in a database a plurality of content, each of the plurality of content associated with a content location and one of a plurality of content channels, the database in electronic communication with the server;
   providing a mobile device;
   providing on the mobile device a subset of the plurality of content, the content location associated with each of the subset of the plurality of content within a predetermined distance of a current location of the mobile device, the subset of the plurality of content changing as the current location of the mobile device changes;
   providing a channel selector on the mobile device for a user to select one of the plurality of content channels, upon selection the subset of the plurality of content changing to include only content associated with the selected content channel;
   receiving new content from the user with the mobile device, the new content associated with a new content location, the creation of the new content only allowed if the new content location is at the current location of the mobile device, upon creation the new content stored in the database as one of the plurality of content; and
   receiving on the server some of the plurality of content from one of one or more providers, the server in electronic communication with the one of the one or more providers over the Internet.

15. The method of claim 14 wherein the predetermined distance is selectable by the user.

16. The method of claim 14 further comprising the step of sending the new content to the one of the one or more providers.

17. The method of claim 14 further comprising the step of notifying the user of a change in the subset of the plurality of content.

18. The method of claim 14 wherein the user comments on one of the subset of the plurality of content, the comments only allowed if the current location of the mobile device is at the content location associated with the one of the subset of the plurality of content.

* * * * *